United States Patent
Lee et al.

(10) Patent No.: US 9,645,429 B2
(45) Date of Patent: May 9, 2017

(54) DISPLAY DEVICE AND MANUFACTURING METHOD THEREOF

(71) Applicant: SAMSUNG DISPLAY CO., LTD., Yongin, Gyeonggi-Do (KR)

(72) Inventors: Sun Hwa Lee, Gyeonggi-do (KR); Kwang-Chul Jung, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 90 days.

(21) Appl. No.: 14/505,097

(22) Filed: Oct. 2, 2014

(65) Prior Publication Data

US 2015/0309357 A1 Oct. 29, 2015

(30) Foreign Application Priority Data

Apr. 23, 2014 (KR) .................. 10-2014-0048919

(51) Int. Cl.
*G02F 1/1333* (2006.01)
*G02F 1/1341* (2006.01)
*G02F 1/1362* (2006.01)

(52) U.S. Cl.
CPC ...... *G02F 1/133377* (2013.01); *G02F 1/1341* (2013.01); *G02F 1/136209* (2013.01)

(58) Field of Classification Search
CPC ................. G02F 1/13394; G02F 1/133377
See application file for complete search history.

(56) References Cited

U.S. PATENT DOCUMENTS

| 5,289,300 | A |  | 2/1994 | Yamazaki et al. |
|---|---|---|---|---|
| 5,986,729 | A |  | 11/1999 | Yamanaka et al. |
| 6,141,072 | A | * | 10/2000 | Drabik ............... G02F 1/13394 216/23 |
| 8,508,695 | B2 | * | 8/2013 | O'Keeffe ............ C09K 19/544 349/168 |
| 2005/0243078 | A1 | * | 11/2005 | Ozeki .................. G02F 1/1334 345/204 |
| 2006/0146267 | A1 |  | 7/2006 | Choi et al. |
| 2010/0014011 | A1 | * | 1/2010 | Mottram ........... G02F 1/133377 349/33 |
| 2012/0062448 | A1 | * | 3/2012 | Kim ................. G02F 1/133377 345/55 |
| 2013/0093985 | A1 |  | 4/2013 | Kang et al. |

(Continued)

FOREIGN PATENT DOCUMENTS

| JP | 2000-330130 | 11/2000 |
|---|---|---|
| KR | 1020030063656 | 7/2013 |

(Continued)

*Primary Examiner* — Sang V Nguyen
(74) *Attorney, Agent, or Firm* — F. Chau & Associates, LLC

(57) ABSTRACT

In an exemplary display device of the present invention, a first microcavity filled with liquid crystal molecules is disposed on a substrate. A roof layer is disposed on an upper side and two facing first sides of the first microcavity. The two facing first sides are arranged in a first direction. A support member is disposed on one of two facing second sides of the first microcavity. The two facing second sides are arranged in a second direction crossing the first direction. An overcoat is disposed on the roof layer and the other of the two facing second sides of the first microcavity. The support member having a column shape is connected to the roof layer.

20 Claims, 12 Drawing Sheets

(56) References Cited

U.S. PATENT DOCUMENTS

| | | | |
|---|---|---|---|
| 2013/0182203 A1* | 7/2013 | Lee | G02F 1/133377 349/106 |
| 2013/0250220 A1 | 9/2013 | Kim et al. | |
| 2014/0184971 A1* | 7/2014 | Yim | G02F 1/1368 349/43 |
| 2014/0198290 A1* | 7/2014 | Lim | G02F 1/133377 349/143 |
| 2014/0253855 A1* | 9/2014 | Yang | G02F 1/133377 349/138 |
| 2014/0267966 A1* | 9/2014 | Won | G02F 1/133377 349/42 |
| 2014/0354912 A1* | 12/2014 | Lee | G02F 1/133377 349/43 |

FOREIGN PATENT DOCUMENTS

| | | | | |
|---|---|---|---|---|
| KR | 1020130084842 | | 7/2013 | |
| KR | 2014-0095120 | * | 8/2014 | G02F 1/1337 |

\* cited by examiner

DISPLAY DEVICE AND MANUFACTURING METHOD THEREOF

CROSS-REFERENCE TO RELATED APPLICATION

This application claims priority under 35 U.S.C. §119 to Korean Patent Application No. 10-2014-0048919 filed on Apr. 23, 2014 in the Korean Intellectual Property Office, the disclosure of which is incorporated by reference herein in its entirety.

TECHNICAL FIELD

The present invention relates to a display device and a manufacturing method thereof.

DISCUSSION OF RELATED ART

Liquid crystal displays are one of flat panel displays. The liquid crystal displays include liquid crystal molecules of which alignment angles are controlled by an electric field applied to the liquid crystal molecules. Such alignment angles determine polarization of incident light so that images are generated on liquid crystal displays.

SUMMARY

According to an exemplary display device of the present invention, a first microcavity filled with liquid crystal molecules is disposed on a substrate. A roof layer is disposed on an upper side and two facing first sides of the first microcavity. The two facing first sides are arranged in a first direction. A support member is disposed on one of two facing second sides of the first microcavity. The two facing second sides are arranged in a second direction crossing the first direction. An overcoat is disposed on the roof layer and the other of the two facing second sides of the first microcavity. The support member having a column shape is connected to the roof layer.

According to an exemplary manufacturing method of a display device in the present invention, a substrate including a pixel electrode and a thin film transistor is formed. The pixel electrode is electrically connected to the thin film transistor. A sacrificial layer is formed on the pixel electrode. A lower insulating layer is formed on the sacrificial layer. An organic material is formed on the lower insulating layer to form a roof layer and a support member. The sacrificial layer is removed to form a plurality of microcavities. Each of the plurality of microcavities is defined by the lower insulating layer, the pixel electrode and the support member. A liquid crystal material is injected into the plurality of microcavities. An overcoat is formed on the roof layer to seal the plurality of microcavities. The support member includes a column shape. The roof layer is formed on the lower insulating layer. The support member is connected to the roof layer.

DESCRIPTION OF THE DRAWINGS

These and other features of the present invention will become more apparent by describing in detail exemplary embodiments thereof with reference to the accompanying drawings of which.

DETAILED DESCRIPTION OF EXEMPLARY EMBODIMENTS

Figure 1:
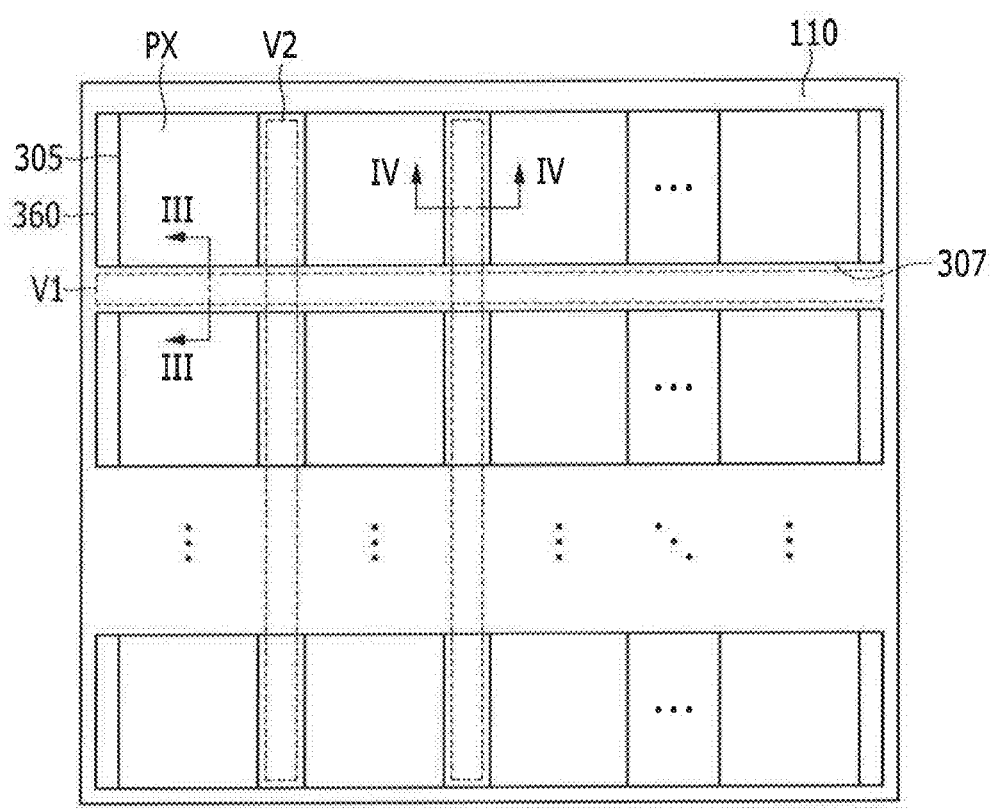
FIG. 1 is a plan view illustrating a display device according to an exemplary embodiment of the present invention.

Exemplary embodiments of the present invention will be described below in detail with reference to the accompanying drawings. However, the present invention may be embodied in different forms and should not be construed as limited to the embodiments set forth herein. In the drawings, the thickness of layers and regions may be exaggerated for clarity. It will also be understood that when an element is referred to as being on another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

First, a display device according to an exemplary embodiment of the present invention will be described below with reference to FIG. 1.

FIG. 1 is a plan view illustrating a display device according to an exemplary embodiment of the present invention.

A display device according to the exemplary embodiment of the present invention includes a substrate 110 formed of an insulating material such as glass or plastic.

A microcavity 305 covered by a roof layer 360 is formed on the substrate 110. The roof layer 360 extends in a row direction, and a plurality of microcavities 305 is formed below one roof layer 360.

The microcavities 305 are disposed in a matrix form, first valleys V1 are positioned between the microcavities 305 adjacent to each other in a column direction, and second valleys V2 are positioned between the microcavities 305 adjacent to each other in a row direction.

Roof layers 360 are spaced apart from each other with the first valleys V1 disposed therebetween. The microcavity 305 is not covered by the roof layer 360, and the microcavity 305 is exposed to the outside at a portion contacting the first valley V1. This is called an injection hole 307. The injection hole 307 is formed at one side of the microcavity 305 contacting the first valley V1.

Each roof layer 360 is spaced apart from the substrate 110 by the microcavity 305. For example, the roof layer 360 is formed to cover the microcavity 305 except for a side in which the injection hole is formed. Accordingly, the roof layer 360 includes three sides and an upper surface to define the microcavity 305. In this case, the side of the roof layer 360 facing the injection hole 307 is a horizontal support member, and a side connected with the horizontal support member and positioned at the edge forming the side wall may be a vertical support member.

The structure of the display device may be variously modified according to an exemplary embodiment. For example, the layout form of the microcavities 305, the first valleys V1, and the second valleys V2 may be modified, and the roof layers 360 may be connected to each other at the first valleys V1, and a part of each roof layer 360 may be spaced apart from the substrate 110 at the second valley V2 and thus the adjacent microcavities 305 may be connected to each other.

Figure 2:
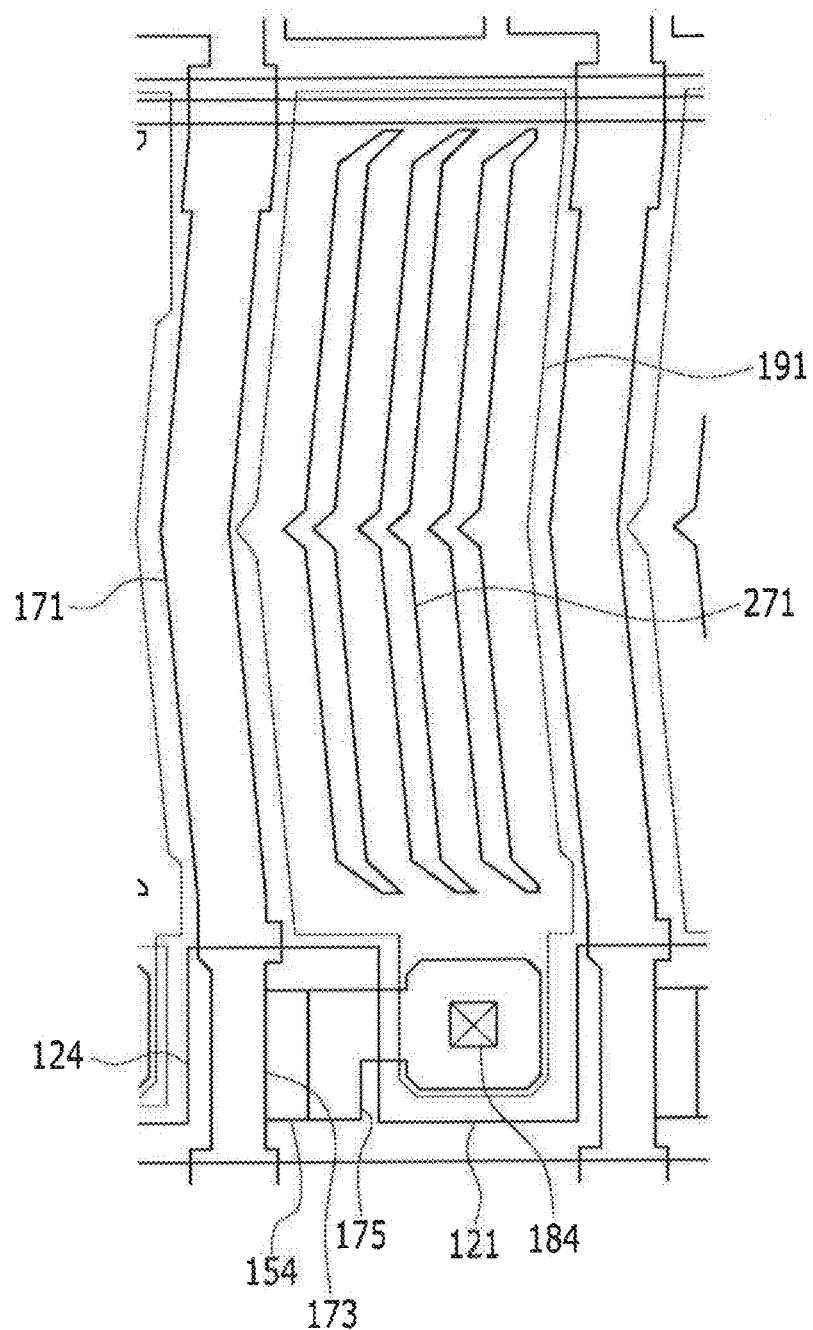
FIG. 2 is an equivalent circuit diagram of one pixel of the display device according to an exemplary embodiment of the present invention.

Hereinafter, the display device according to an exemplary embodiment of the present invention will be described with reference to FIGS. 2 to 4.

First, a gate conductor including a gate line 121 is formed on an insulation substrate 110 formed of a transparent, insulating material such as glass, plastic, and the like.

The gate line 121 includes a gate electrode 124 and a wide end portion (not illustrated). The wide end portion may be connected to another layer or an external driving circuit. The gate line 121 may include aluminum-based metal such as aluminum (Al) or an aluminum alloy, silver-based metal such as silver (Ag) or a silver alloy, copper-based metal such as copper (Cu) or a copper alloy, molybdenum-based metal such as molybdenum (Mo) or a molybdenum alloy, chromium (Cr), tantalum (Ta), and titanium (Ti). However, the gate line 121 may have a multilayered structure including at least two conductive layers having different physical properties.

A gate insulating layer 140 is formed on the gate line 121. The gate insulating layer 140 may include silicon nitride (SiNx), silicon oxide (SiOx) or the like. The gate insulating layer 140 may have a multilayered structure including at least two insulating layers having different physical properties.

A semiconductor 154 is formed on the gate insulating layer 140. The semiconductor 154 may include amorphous silicon, polysilicon or an oxide semiconductor material.

An ohmic contact (not illustrated) may be positioned on the semiconductor 154. The ohmic contact (not illustrated) may include a material such as n+ hydrogenated amorphous silicon or silicide. The n+ hydrogenated amorphous silicon may include an n-type impurity such as phosphorus which is doped at a high concentration. A pair of ohmic contacts (not illustrated) may be disposed on the semiconductor 154 to form a transistor. In the case where semiconductor 154 is an oxide semiconductor, the ohmic contact may be omitted.

A data conductor including a data line 171 including a source electrode 173 and a drain electrode 175 is formed on the semiconductor 154 and the gate insulating layer 140.

The data line 171 includes a wide end portion (not illustrated) for connection with another layer or an external driving circuit. The data line 171 transfers a data signal and mainly extends in a vertical direction to cross the gate line 121.

In this case, the data line 171 includes a first curved portion with a curved shape to acquire maximum transmittance of the liquid crystal display, and parts of the curved portion meet each other in a middle region of the pixel area to have a V-lettered shape. A second curved portion which is curved to form a predetermined angle with the first curved portion may be further included in the middle region of the pixel area.

The first curved portion of the data line 171 may be curved to form an angle of about 7° with a vertical reference line which forms an angle of 90° with an extending direction of the gate line 121. The second curved portion disposed in the middle region of the pixel area may be further curved to form an angle of about 7° to about 15° with the first curved portion.

The source electrode 173 is a part of the data line 171, and disposed on the same line as the data line 171. The drain electrode 175 is formed to extend in parallel with the source electrode 173. Accordingly, the drain electrode 175 is parallel with the part of the data line 171.

The gate electrode 124, the source electrode 173, and the drain electrode 175 form one thin film transistor (TFT) together with the semiconductor 154, and a channel of the thin film transistor is formed in the semiconductor 154 between the source electrode 173 and the drain electrode 175.

The source electrode 173 positioned on the same line with the data line 171 and the drain electrode 175 extending in parallel with the data line 171, and as a result, a width of the thin film transistor may be increased while an area occupied by the data conductor is not increased, thereby increasing an aperture ratio of the liquid crystal display.

Alternatively, the source electrode 173 and the drain electrode 175 may have different shapes.

The data line 171 and the drain electrode 175 may include refractory metal such as molybdenum, chromium, tantalum, and titanium or an alloy thereof, and may have a multilayered structure including a refractory metal layer (not illustrated) and a low resistive conductive layer (not illustrated). An example of the multilayered structure may include a double layer of a chromium or molybdenum (alloy) lower layer and an aluminum (alloy) upper layer, or a triple layer of a molybdenum (alloy) lower layer, an aluminum (alloy) middle layer, and a molybdenum (alloy) upper layer. However, the data line 171 and the drain electrode 175 may include various metals or conductors other than the metals described above.

A passivation layer 180 is disposed on the data conductor 171, 173, and 175, the gate insulating layer 140, and an exposed portion of the semiconductor 154. The passivation layer 180 may include an organic insulating material, an inorganic insulating material, or the like.

A color filter 230 in each pixel area PX is formed on the passivation layer 180. Each color filter 230 may display one of the primary colors such as three primary colors of red, green and blue. The color filter 230 is not limited to display the three primary colors of red, green and blue, but may display cyan, magenta, yellow, and white-based colors. The color filter 230 may be elongated in a column direction along a space between the adjacent data lines 171.

An organic layer 240 is disposed on the color filter 230. The organic layer 240 has a thickness larger than that of the passivation layer 180 and may have a flat surface.

The organic layer 240 is disposed in the display area where the plurality of pixels is positioned. The organic layer 240 need not be positioned in the peripheral area where a gate pad portion or a data pad portion is formed. Alternatively, the organic layer 240 may be positioned in the peripheral area where a gate pad portion or a data pad portion is formed.

The organic layer 240, the color filter 230, and the passivation layer 180 have a contact hole 184.

A common electrode 270 is positioned on the organic layer 240. The common electrode 270 may have a planar shape, and the common electrode 270 is disposed in the display area where the plurality of pixels is positioned, but need not be positioned in the peripheral area where the gate pad portion or the data pad portion is formed.

The common electrode 270 may include a transparent conductive material such as indium tin oxide (ITO) and indium zinc oxide (IZO).

An insulating layer 250 is positioned on the common electrode 270. The insulating layer 250 may include an inorganic insulating material such as silicon nitride (SiNx), silicon oxide (SiOx), and silicon oxynitride (SiOxNy). The insulating layer 250 serves to protect the color filter 230 including an organic material and the like and insulate the common electrode 270 and the pixel electrode 191 from each other. For example, the insulating layer 250 is disposed between the common electrode 270 and the pixel electrode 191 overlapped each other. Accordingly, it is possible to prevent the common electrode 270 and the pixel electrode 191 from being short-circuited by contacting each other.

The pixel electrode 191 is positioned on the insulating layer 250. The pixel electrode 191 includes curved edges which are substantially parallel with the first curved portion and the second curved portion of the data line 171.

The pixel electrode 191 may include a transparent conductive material such as ITO and IZO.

The pixel electrode 191 is physically and electrically connected with the drain electrode 175 through the contact hole 184 formed in the organic layer 240, the color filter 230, and the passivation layer 180. The pixel electrode 191 may serve to receive a voltage from the drain electrode 175. For example, the pixel electrode 191 may receive the data voltage from the drain electrode 175.

The common electrode 270 may receive a reference voltage having a predetermined magnitude from a reference voltage applying unit disposed at the outside of the display area.

The pixel electrode 191 and the common electrode 270 may generate an electric field therebetween by applying the voltage, and liquid crystal molecules of the liquid crystal layer 310 positioned between the two electrodes 191 and 270 may rotate in a direction parallel to a direction of the electric field. Polarization of light passing through the liquid crystal layer may vary according to the rotation directions of the liquid crystal molecules determined as described above.

A lower insulating layer 350 is formed on the pixel electrode 191 to be spaced apart from the pixel electrode 191 at a predetermined distance. The lower insulating layer 350 may include an inorganic insulating material such as silicon nitride (SiNx) and silicon oxide (SiOx).

A microcavity 305 is formed between the pixel electrode 191 and the lower insulating layer 350. For example, the microcavity 305 is surrounded by the pixel electrode 191 and the lower insulating layer 350. A width and an area of the microcavity 305 may be variously modified according to a size and a resolution of the display device.

A first alignment layer 11 is formed on the pixel electrode 191. The first alignment layer 11 is also formed directly on the insulating layer 250 which is not covered by the pixel electrode 191.

A second alignment layer 21 is formed on the lower insulating layer 350. The second alignment layer 21 faces the first alignment layer 11.

The first alignment layer 11 and the second alignment layer 21 may include vertical alignment layers having alignment materials such as polyamic acid, polysiloxane, and polyimide. The first and second alignment layers 11 and 21 may be connected to each other at an edge of the pixel area PX as illustrated in FIG. 3.

A liquid crystal layer including liquid crystal molecules 310 is formed in the microcavity 305 positioned between the pixel electrode 191 and the lower insulating layer 350.

A light blocking member 220 is formed in a region between the adjacent color filters 230. For example, the light blocking member 220 is positioned on the pixel electrode 191 and the insulating layer 250 which is not covered by the pixel electrode, as illustrated in FIG. 3. The light blocking member 220 is formed on a boundary of the pixel area PX and the thin film transistor to prevent light leakage.

The light blocking member 220 extends along the gate line 121 to be extended upward and downward, and includes a horizontal light blocking member covering a region where the thin film transistor and the like are formed and a vertical light blocking member extending along the data line 171. For example, the horizontal light blocking member may be formed at the first valley V1, and the vertical light blocking member may be formed at the second valley V2. The color filter 230 and the light blocking member 220 may overlap with each other in a partial region.

Next, the roof layer 360 is formed on the lower insulating layer 350. The roof layer 360 may include an organic material. The microcavity 305 is formed below the roof layer 360, and the roof layer 360 is hardened by a curing process to maintain the shape of the microcavity 303. The roof layer 360 is formed to be spaced apart from the pixel electrode 191 with the microcavity 305 therebetween.

The roof layers 360 are formed in each pixel area PX along a pixel row and in the second valley V2. The roof layers 360 need not be formed in the first valley V1. The microcavity 305 is not formed below the roof layer 360 formed in the second valley V2. Accordingly, a thickness of the roof layer 360 positioned in the second valley V2 may be larger than a thickness of the roof layer 360 positioned in the pixel area, and the thick region may be called a vertical support member 367. An upper surface and both sides of the microcavity 305 are formed to be covered by the roof layer 360.

An injection hole 307 exposing a part of the microcavity 305 is formed in the roof layer 360. The lower insulating layer 350 adjacent to the region where the injection hole 307 is formed protrudes beyond the roof layer 360.

The injection hole 307 may be formed at one edge of the pixel area PX. For example, the injection hole 307 may be formed at a lower side of the pixel area PX to expose one side of the microcavity 305. Alternatively, the injection hole 307 may be formed at an upper side of the pixel area PX.

Further, the injection hole 307 is formed at one of two sides of each microcavity 305. The two sides face each other.

Since the microcavity 305 is exposed by the injection hole 307, an aligning agent, a liquid crystal material, or the like may be injected into the microcavity 305 through the injection hole 307.

The support member 365 is formed at the position facing the injection hole 307 below the roof layer 360. For example, when the injection hole 307 is formed at one side of the microcavity 305, the support member 365 is positioned at an opposite side of the microcavity 305. Accordingly, the injection hole 307 faces the support member through the microcavity 305.

Hereinafter, the "support member 365" may be referred to a horizontal support member 365 facing the injection hole 307. The vertical support member 367 will be described later.

The microcavity 305 is formed below the roof layer 360, and the support member 365 supports the roof layer 360 to prevent the roof layer 360 from sagging downward. The injection hole 397 serves as an inlet of the microcavity 305 for supplying liquid crystal molecules.

The support member 365 is formed at one of two facing sides of two different microcavities 305. The plurality of microcavities 305 is disposed in a matrix form which includes a plurality of pixel rows and a plurality of pixel columns. For example, the microcavity 305 may have a quadrangular shape. A microcavity 305 disposed in a first row may include a lower side. A microcavity 305 disposed in a second row may include an upper side. The lower and the upper sides may face each other. In this case, the support member 365 is formed at one of the lower and the upper sides, and the support member 365 is formed at the other side of the lower and the upper sides. The reverse case is the same.

In this case, positions where the support member 365 and the injection hole 307 are formed are different from each other. For example, when the injection hole 307 is formed at the upper side of the microcavity 305, the support member 365 is formed at the lower side of the microcavity 305. The reverse case is the same. When the injection hole 307 is formed at the lower side of the microcavity 305, the support member 365 is formed at the upper side of the microcavity 305. In the region where the injection hole 307 is formed, the lower insulating layer 350 protrudes beyond the roof layer 360, and in the region where the support member 365 is formed, the roof layer 360 and the lower insulating layer 350 may substantially coincide with each other. For example, one end the roof layer 360 is substantially is aligned with an outer side of the support member 365 so that no overhang of the roof layer 360 exists in the region where the support member 365 is formed.

The first valleys V1 are formed between the microcavities 305 positioned in different rows. The support member 365 is formed to be adjacent to one side of the first valley V1.

The support member 365 is connected with the roof layer 360, and may be made of the same material as the roof layer 360. The lower insulating layer 350 may be positioned below the support member 365. For example, the lower insulating layer 350 is disposed between the support member 365 and the microcavity 305.

However, the present invention is not limited thereto, and the support member 365 may include a different material from the roof layer 360, and the lower insulating layer 350 need not be positioned below the support member 365. In this case, the support member 365 may be formed directly on the pixel electrode 191.

A planar shape of the support member 365 may be quadrangle, but is not limited thereto, and may have various shapes such as a circle and a triangle.

Figure 3:
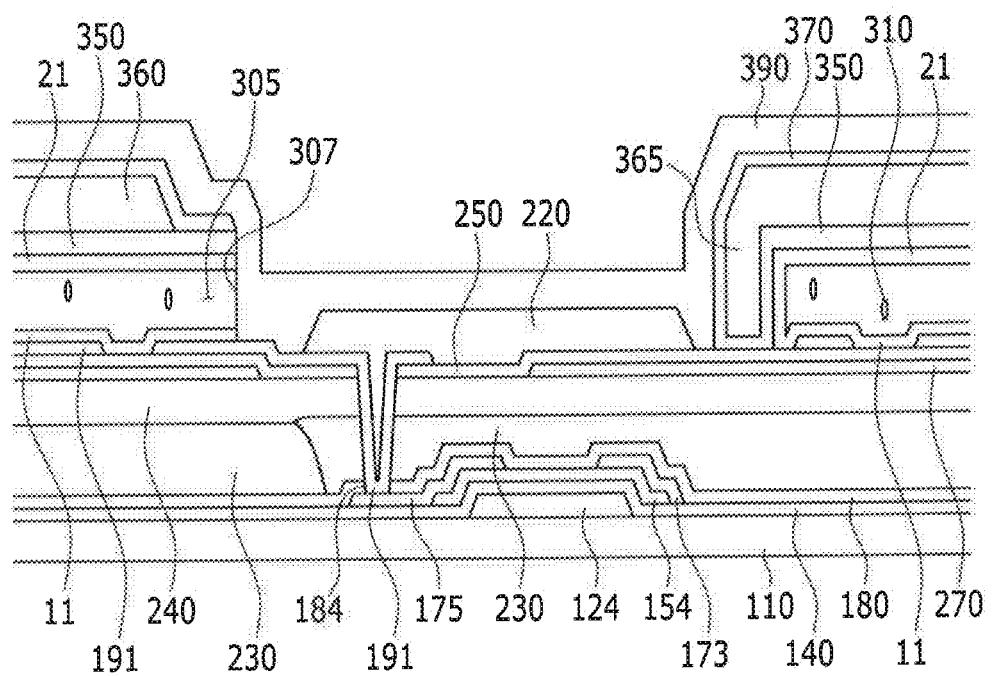
FIG. 3 is a cross-sectional view illustrating the display device taken along line III-III according to an exemplary embodiment of the present invention.
Figure 4:
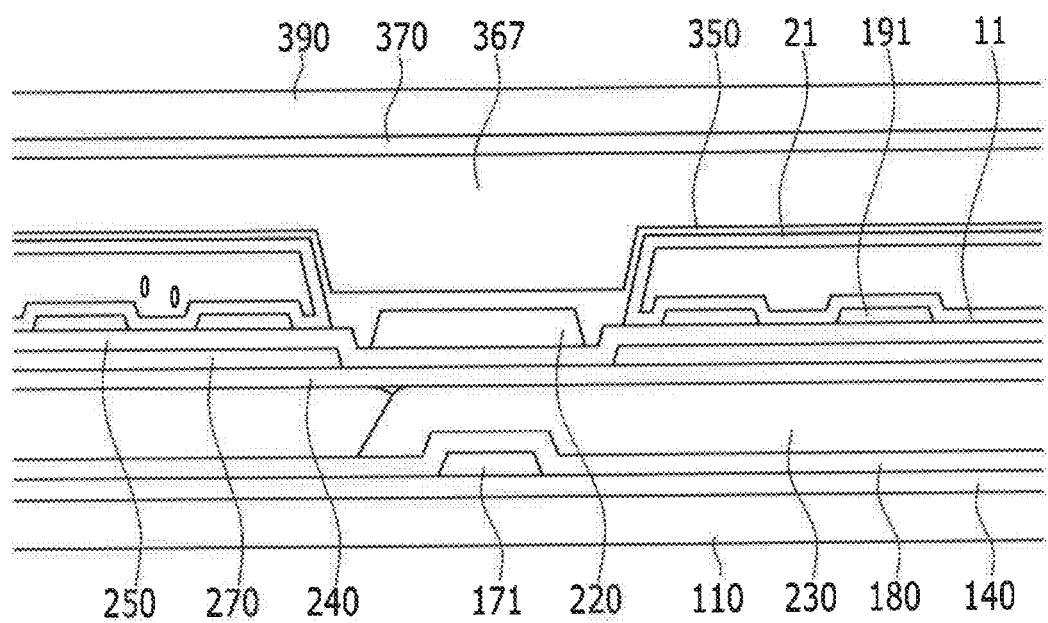
FIG. 4 is a cross-sectional view illustrating the display device taken along line IV-IV according to an exemplary embodiment of the present invention.

The support member 365 may be aligned with one end of the roof layer as illustrated in FIG. 3. For example, when the support member 365 is positioned at the upper side of the microcavity, the upper side of the roof layer 360 may substantially coincide with one edge of the support member 365. As a result, the lower insulating layer 350 does not protrude beyond the roof layer 360 in the region where the support member is formed. The lower insulating layer 350 protrudes beyond the roof layer 360 in the region where the injection hole 307 is formed. For example, the lower insulating layer 350 protrudes beyond the roof layer 360 in the region where the injection hole 307 is formed.

Accordingly, when one end of the roof layer 360 and one end of the support member 365 are aligned to be substantially coincide with each other, the insulating layer 350 does not protrude beyond the roof layer 360, and thus the aperture ratio may be increased without wasting a display region having pixels. The injection holes 307 may be easily spotted, and liquid crystal molecules may be easily injected due to the increased aperture ratio of the region where a thin film transistor is formed.

An upper insulating layer 370 is formed on the roof layer 360. The upper insulating layer 370 may include an inorganic insulating material such as silicon nitride (SiNx) and silicon oxide (SiOx). The upper insulating layer 370 may be formed to cover an upper surface and sides of the roof layer 360. The upper insulating layer 370 serves to protect the roof layer 360 including an organic material. Alternatively, the upper insulating layer 370 may be omitted.

As illustrated in FIG. 3, the upper insulating layer 370 is in contact with an end portion of the lower insulating layer 350. The end portion of the lower insulating layer 350 protrudes beyond the roof layer 360 in the region where the injection hole 307 is positioned. The upper insulating layer 370 includes a stepped cross section near the injection hole 307.

The upper insulating layer 370 is connected with the lower insulating layer 350. For example, the upper insulating layer 370 is connected or overlapped with the lower insulating layer 350 in a position facing the injection hole 307 or the region where the support member 365 is positioned.

An overcoat 390 is formed on the upper insulating layer 370. The overcoat 390 is formed to cover the injection hole 307 exposing the internal part of the microcavity 305 to the outside. For example, the overcoat 390 may seal the microcavity 305 so that the liquid crystal molecules 310 formed in the microcavity 305 are not discharged to the outside. Since the overcoat 390 is in contact with the liquid crystal molecules 310, the overcoat 390 may include a material which does not react with liquid crystal molecules 310. For example, the overcoat 390 may include parylene or the like.

The overcoat 390 may be formed in a multilayer such as a double layer and a triple layer. The double layer includes two layers formed of different materials. The triple layer includes three layers of which two adjacent two layers are formed of materials different from each other. For example, the overcoat 390 may include a layer formed of an organic insulating material and a layer formed of an inorganic insulating material.

Although not illustrated, polarizers may be formed on upper and lower surfaces of the display device. The polarizers may include a first polarizer and a second polarizer. The first polarizer may be attached onto the lower surface of the substrate 110, and the second polarizer may be attached onto the overcoat 390.

Next, a manufacturing method of a display device according to an exemplary embodiment of the present invention will be described below with reference to FIGS. 5 to 11 and FIGS. 1 to 4.

FIGS. 5 to 11 are cross-sectional views showing a manufacturing method of a display device according to an exemplary embodiment of the present invention.

Figure 5:
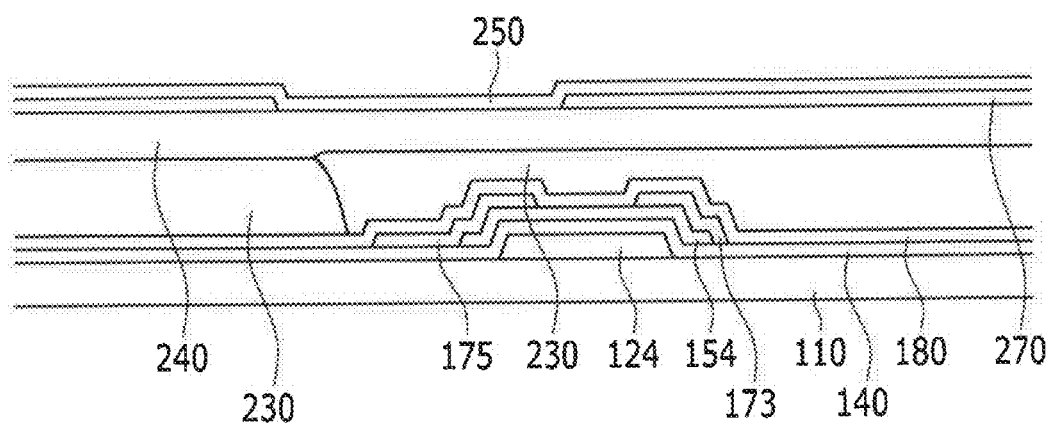
FIGS. 5 to 11 are cross-sectional views of the display device taken along line III-III according to an exemplary embodiment of the present invention by a manufacturing method.
Figure 6:
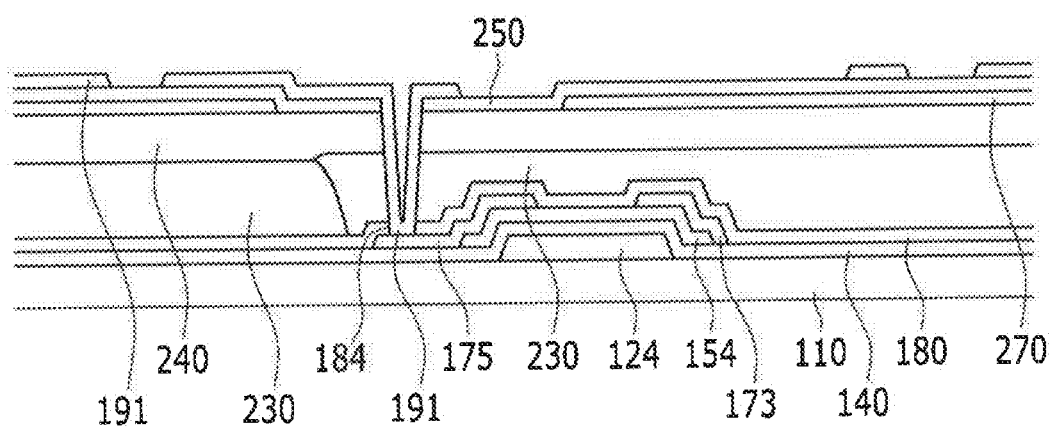

First, in FIG. 5, a gate line 121 including a gate electrode 124 is formed on an insulation substrate 110, and a gate insulating layer 140 is formed on the gate line 121. A semiconductor 154, a data line 171 including a source electrode 173, and a drain electrode 175 are formed on the gate insulating layer 140. A passivation layer 180 is formed on the data line 171 and the drain electrode 175.

Next, a color filter 230 is formed in each pixel area PX on the passivation layer 180. The color filter 230 is formed in each pixel area PX, but need not be formed in the first valley V1. Further, the color filters 230 having the same color may be formed in a column direction of the plurality of pixel areas PX. In the case of forming the color filters 230 having three colors, a first color filter 230 may be first formed using a mask, and then a second color filter 230 may be formed by shifting the mask. Next, the second color filter 230 may be formed and then a third color filter may be formed by shifting the mask.

Next, an organic layer 240 and a common electrode 270 are formed on the color filter 230, and an insulating layer 250 is formed on the common electrode 270 with an inorganic insulating material such as silicon nitride (SiNx) and silicon oxide (SiOx), Next, a contact hole 184 is formed by etching the passivation layer 180, the color filter 230, the organic layer 240 and the insulating layer 250 so that a part of the drain electrode 175 is exposed.

Next, a pixel electrode 191 in the pixel RX is formed on the insulating layer 250 by depositing and patterning a transparent metal material such as indium tin oxide (ITO) and indium zinc oxide (IZO). The pixel electrode 191 is electrically connected with the drain electrode 175 through the contact hole 184.

Figure 7:
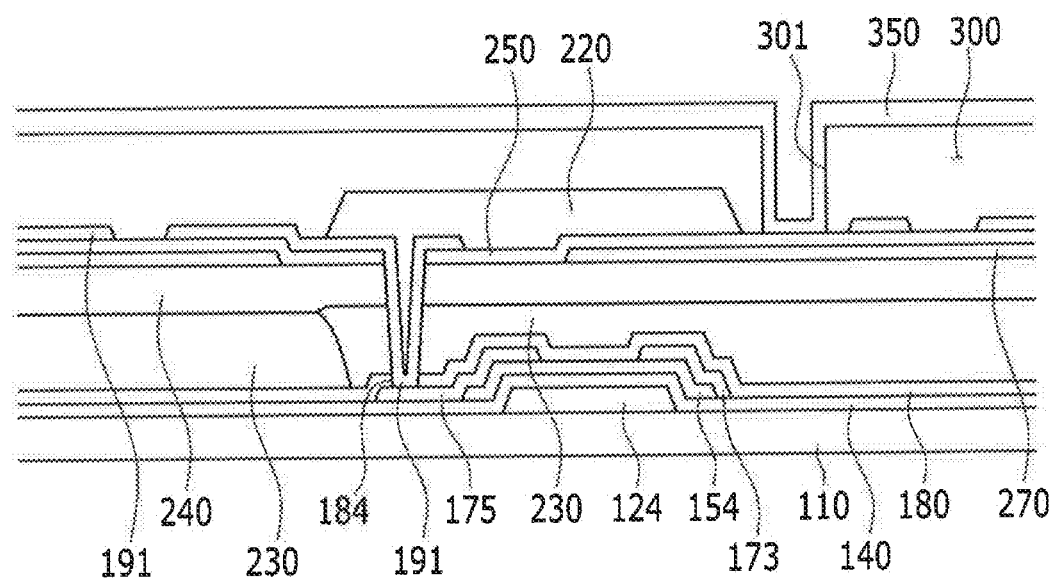
Figure 8:
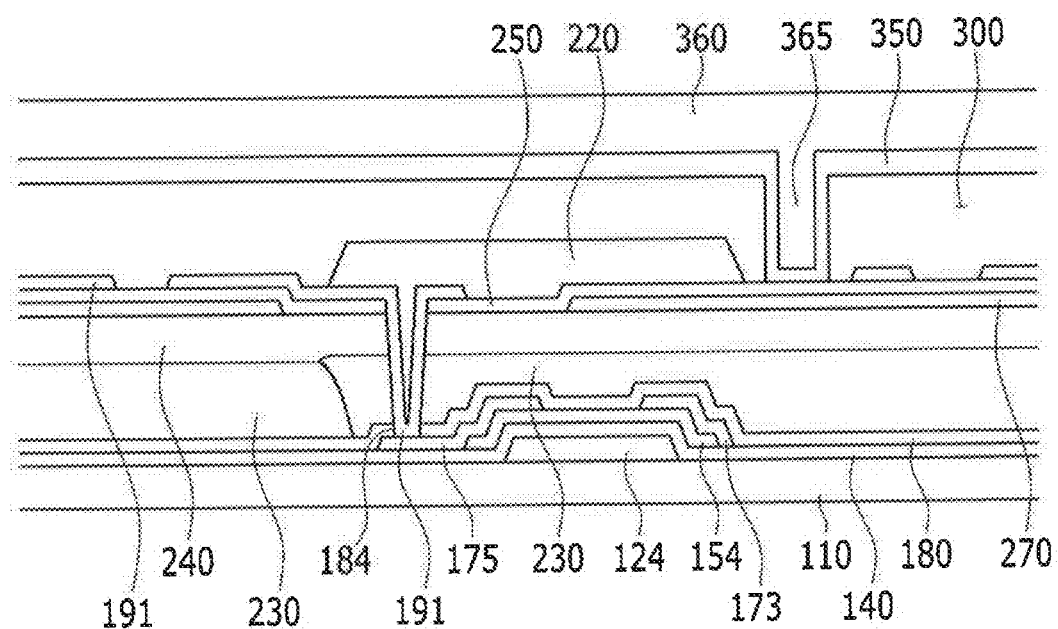

Next, as illustrated in FIG. 7, a light blocking member 220 is formed on the pixel electrode 191 and the insulating layer 250, and positioned on the boundary of each pixel area PX and the thin film transistor region. For example, the light blocking member 220 may be formed in the first valley V1. Further, the light blocking member 220 may be formed near one edge of each pixel area PX.

The light blocking member 220 is formed after forming the color filters 230, but the present invention is not limited thereto. For example, the light blocking member 220 may be first formed and then the color filters 230 may be formed.

Next, as illustrated in FIG. 7, a sacrificial layer 300 is formed by coating a photosensitive organic material on the pixel electrode 191 and performing a photolithography process.

The sacrificial layers 300 are patterned to be connected to each other along the plurality of pixel columns. For example, the sacrificial layers 300 are formed to cover each pixel area PX by removing the photosensitive organic material positioned in the second valley V2. An opening 301 is formed by removing a partial region of the sacrificial layer 300 by a photolithography process.

The opening 301 may be formed to be adjacent to the first valley V1. The lower insulating layer 350 is conformally formed on the sacrificial layer 300 without completely filling the opening 301.

For example, the lower insulating layer 350 may include an inorganic insulating material such as silicon oxide and silicon nitride.

Next, the roof layer 360 is formed on the lower insulating layer 350 with an organic material, and the support member 363 is formed in the opening 301. The roof layer 360 and the support member 365 may be formed by using the same material during the same process.

The lower insulating layer 330 may be positioned below the roof layer 360 and the support member 365.

The support member 365 has a column shape, and the planar shape of the support member 365, when viewed from the above, may have various shapes such as a circle, a quadrangle, and a triangle.

Figure 9:
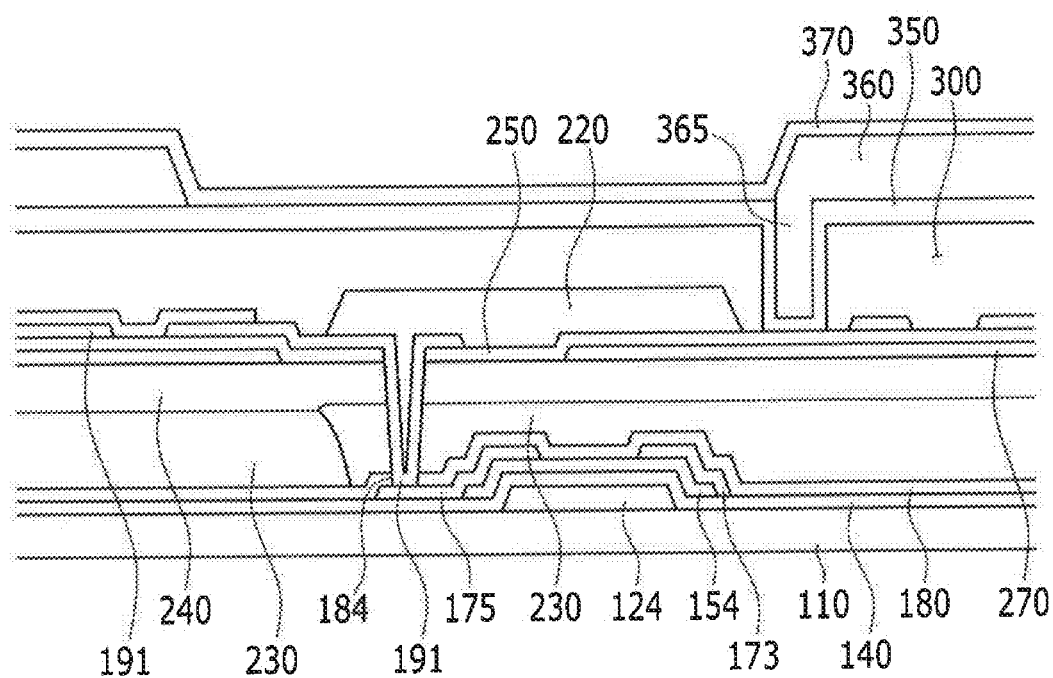

In FIG. 9, the roof layer 360 positioned in the first valley V1 may be removed by patterning the roof layer 360. As a result, the roof layers 360 may be formed to be connected to each other along a plurality of pixel rows.

Further, the support member 365 and one end of the roof layer 360 may be formed to be aligned with each other. For example, when the support member 365 is positioned at the upper side of a microcavity, the upper side of the roof layer 360 and the side of the support member 365 may coincide with each other. As a result, the lower insulating layer 350 does not protrude beyond the roof layer 360 in the region where the support member 365 is formed. The lower insulating layer 350 protrudes beyond the roof layer 360 in the region where the injection hole 307 is formed.

Accordingly, when one end of the roof layer 360 and one end of the support member 365 are aligned to be substantially coincide with each other, the insulating layer 350 does not protrude beyond the roof layer 360, and thus the aperture ratio may to be increased without wasting a display region having pixels. Due to the increased aperture ratio of the region where a thin film transistor is formed, liquid crystal molecules may be easily injected.

Next, an upper insulating layer 370 is formed on the roof layer 360 with an inorganic insulating material such as silicon nitride (SiNx) and silicon oxide (SiOx). The upper insulating layer 370 is formed on the patterned roof layer 360 to cover and protect the side of the roof layer 360.

Figure 10:
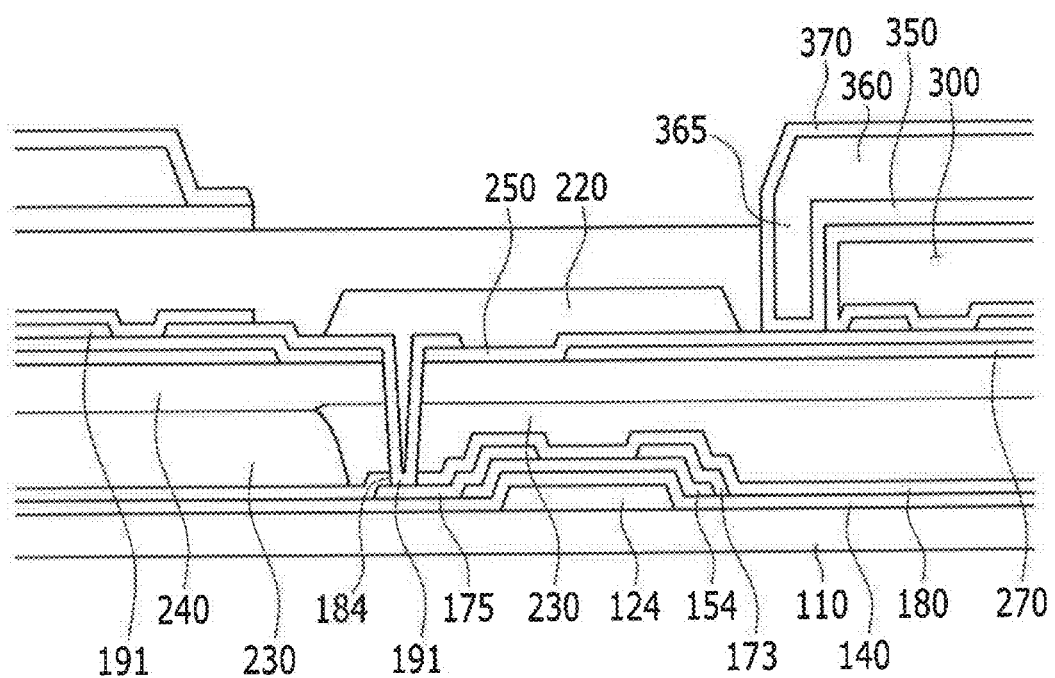

Next, as illustrated in FIG. 10, the upper insulating layer 370 and the lower insulating layer 350 positioned at the first valley V1 are removed by patterning the upper insulating layer 370 and the lower insulating layer 350.

As such, the sacrificial layer 300 positioned at the first valley V1 is exposed to the outside by patterning the upper insulating layer 370 and the lower insulating layer 350.

Next, the sacrificial layer 300 is fully removed by supplying a developer onto the substrate 110 where the sacrificial layer 300 is exposed and the sacrificial layer 300 is fully removed by an aching process. The removal of the sacrificial layer 300 forms the microcavity 305 replacing the sacrificial layer 300.

The pixel electrode 191 and the roof layer 360 are spaced apart from each other with the microcavity 305 therebetween. The roof layer 360 is formed to cover an upper surface and both sides of the microcavity 305. An injection hole 307 is not covered by the roof layer 360.

The microcavity 305 is exposed to the outside through the injection hole 307 which is not covered by the roof layer 360. The injection hole 307 may be formed along the first valley V1. For example, the injection hole 307 may be formed at one of the edges of the pixel area PX. For example, the injection hole 307 may be formed to expose the upper side or the lower side of the microcavity 305 disposed in the pixel area PX. Alternatively, the injection hole 307 may be formed along the second valley V2.

Figure 11:
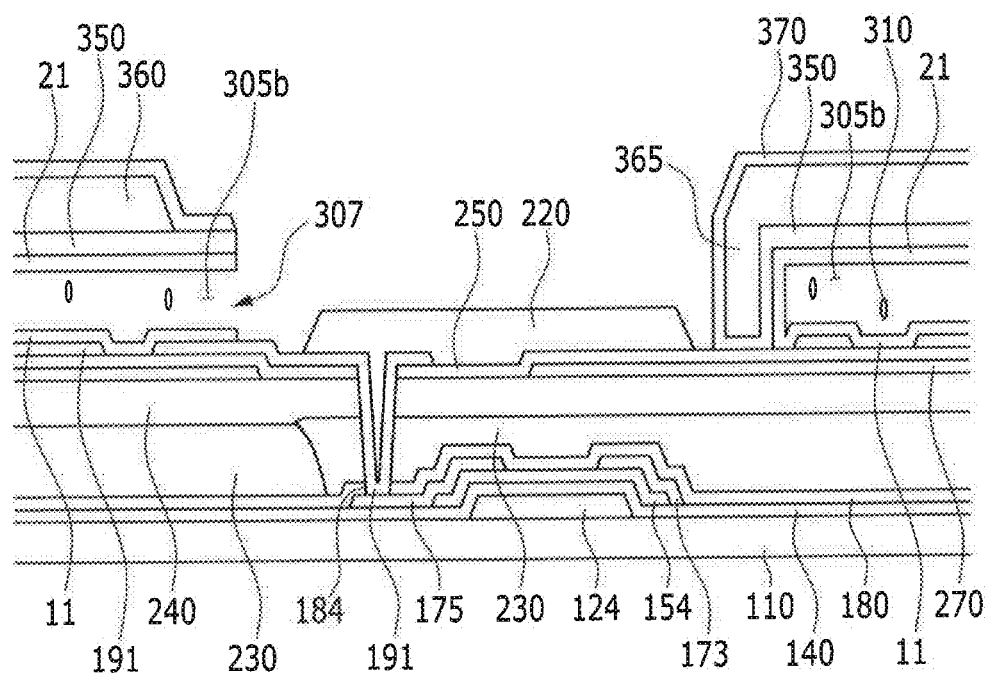

Hereinafter, a positional relationship of the injection hole 307 and the support member 365 will be described below. For the convenience of a description, FIG. 11 shows two microcavities 305a and 305b only. The two microcavities 305a and 305b is adjacent to each other along a direction in which the second valley V2 is extended.

In this case, the support member 365 adjacent to the microcavity 305b faces the injection hole 307 exposing the inside of the microcavity 305-a. Each microcavity may be disposed between one injection hole 307 and one support member 365. For the convenience of a description, a half of each microcavities 305a and 305b are shown. For example, when the injection hole 307 is formed in the lower side of the microcavity 305a, the support member 365 may be formed in the upper side of the microcavity 305b.

Next, the roof layer 360 is cured by applying heat to the substrate 110. This is to maintain the shape of the microcavity 305 by the roof layer 360.

In FIG. 11, when an aligning agent containing an alignment material is dropped on the substrate 110 by a spin coating method or an inkjet method, the aligning agent is injected into the microcavity 305 through the injection hole 307. When the aligning agent is injected into the microcavity 305 and then a curing process is performed, a solution component is evaporated, and the alignment material remains on a wall surface in the microcavity 305.

Accordingly, the first alignment layer 11 is formed on the pixel electrode 191, and the second alignment layer 21 is formed on the lower insulating layer 350. The first alignment layer 11 and the second alignment layer 21 face each other. The first alignment layer 11 and the second alignment layer 21 are connected to each other at one end of the microcavity 305b. A space 305 is defined by the first and the second alignment layers 11 and 21.

The first and second alignment layers 11 and 21 may be aligned in a vertical direction to the substrate 110, except for the injection hole 307 of the microcavity 303a. UV rays may be irritated on the first and second alignment layers 11 and 21. The first and second alignment layers 11 and 21 may be aligned in a horizontal direction to the substrate 110.

Next, an overcoat 390 is formed by depositing a material which does not react with the liquid crystal molecules 310 on the upper insulating layer 370. The overcoat 390 is formed to cover the injection hole 307 where the microcavity 305a is exposed to the outside to seal the microcavity 305a. For the convenience of a description, the overcoat 390 seals the microcavity 305a in FIG. 11. The inventive concept is not limited thereto, and the overcoat 390 may seal injection holes of at least two microcavities. For example, the microcavity 305b may be sealed by covering an injection hole using the overcoat 390.

Next, although not illustrated, polarizers may be attached onto the upper and lower surfaces of the display device. The polarizers may include a first polarizer and a second polarizer. The first polarizer may be attached onto the lower surface of the substrate 110, and the second polarizer may be attached onto the overcoat 390.

Figure 12:
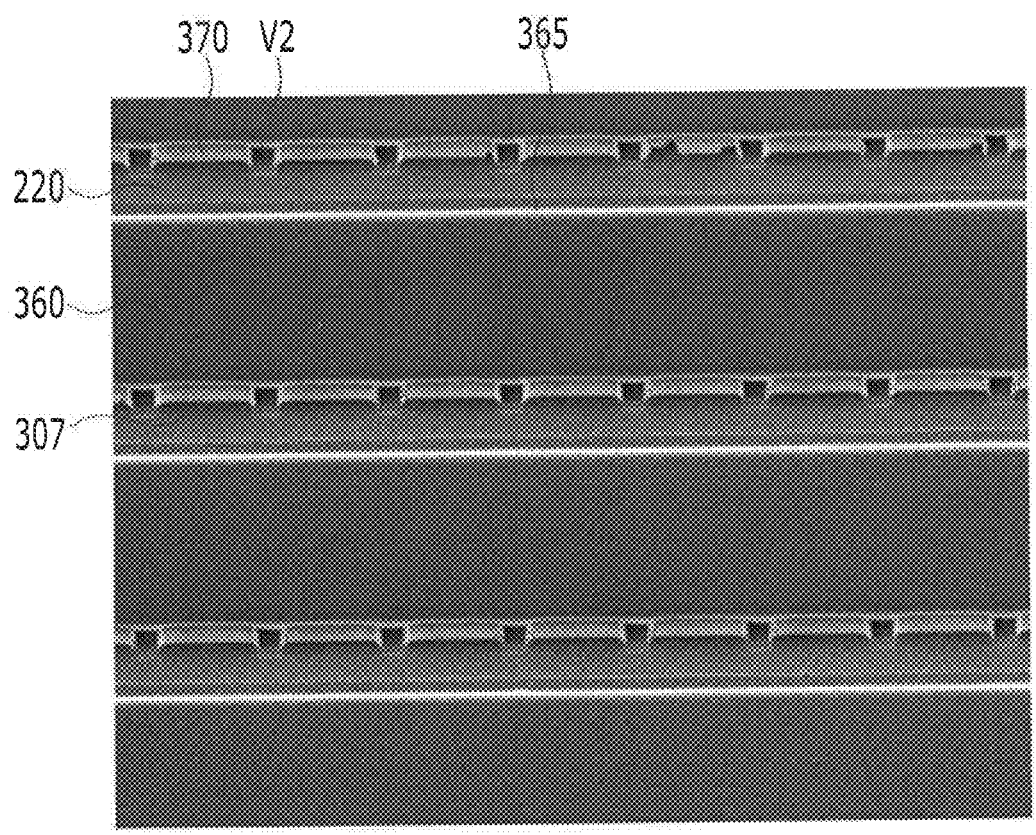
FIG. 12 is an Scanning Electron Microscope (SEM) image of the display device according to the exemplary embodiment of the present invention.

FIG. 12 is an SEM (Scanning Electron Microscope) image of a display device according to an exemplary embodiment of the present invention. It can be seen in the SEM image that an upper portion has a laminated structure. The laminated upper portion has a flat structure.

For example, one end of the roof layer 360 and one end of the support member 365 are aligned, and as a result, an unnecessary protruding region may be removed. Accordingly, it is possible to increase an aperture ratio by an area corresponding to the protruding region or increase a formation area of the thin film transistor for injecting the liquid crystal.

The first and the second valleys V1 and V2 can be interchangeably used to describe the present invention.

While the present invention has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A display device, comprising:
a substrate;
a first microcavity of the plurality of microcavities is disposed on the substrate and, filled with liquid crystal molecules;
a roof layer disposed on an upper side and two facing first sides of the first microcavity,
wherein the two facing first sides are arranged in a first direction;
a support member disposed on one of two facing second sides of the first microcavity, wherein each first microcavity of the plurality of microcavities is defined by the lower insulating layer, a pixel electrode and the support member;
wherein the two facing second sides are arranged in a second direction crossing the first direction; and
an overcoat disposed on the roof layer and the other of the two facing second sides of the first microcavity,
wherein the support member having a column shape is connected to the roof layer.

2. The display device of claim 1,
wherein an outer side of the support member is substantially aligned with one end of the roof layer, and
wherein an inner side of the support member faces the first microcavity.

3. The display device of claim 1, further comprising:
a second microcavity disposed on the substrate and filled with liquid crystal molecules,
wherein the second microcavity is arranged in the first direction and spaced apart from the first microcavity; and
a first valley disposed between the first and second microcavities and extended in the second direction,
wherein the roof layer is disposed in the first valley.

4. The display device of claim 1, further comprising:
a thin film transistor disposed on the substrate;
a common electrode and a pixel electrode disposed on the thin film transistor;
an insulating layer interposed between the common electrode and the pixel electrode;
a color filter disposed on the thin film transistor; and
an organic layer disposed on the color filter.

5. The display device of claim 4, further comprising:
a light blocking member disposed on the pixel electrode.

6. The display device of claim 4, further comprising:
a lower insulating layer spaced apart from the pixel electrode to face the pixel electrode; and
an upper insulating layer disposed on the roof layer.

7. The display device of claim 6,
wherein the lower insulating layer and the upper insulating layer contact each other near the other of the two facing second sides of the first microcavity.

8. The display device of claim 7,
wherein the upper insulating layer has a stepped shape,
wherein one end of the lower insulation layer is protruded beyond the roof layer to be in contact with the upper insulating layer to form the stepped shape, and
wherein the other end of the lower insulation layer is in contact with the inner side of the support member.

9. The display device of claim 3, further comprising:
a third microcavity disposed on the substrate and filled with liquid crystal molecules,
wherein the third microcavity is arranged in the second direction and spaced apart from the first microcavity; and
a second valley disposed between the first and second microcavities and extended in the first direction,
wherein the roof layer is not disposed in the second valley.

10. The display device of claim 9,
wherein the support member is adjacent to one side of the first valley.

11. A manufacturing method of a display device, comprising: forming a substrate including a pixel electrode and a thin film transistor, wherein the pixel electrode is electrically connected to the thin film transistor; forming a sacrificial layer on the pixel electrode; forming a lower insulating layer on the sacrificial layer; forming an organic material on the lower insulating layer to form a roof layer and a support member; removing the sacrificial layer to form a plurality of microcavities, wherein each of the plurality of microcavities is defined by the lower insulating layer, the pixel electrode and the support member; injecting a liquid crystal material into the plurality of microcavities; and forming an overcoat on the roof layer to seal the plurality of microcavities, wherein the support member includes a column shape, the roof layer is formed on the lower insulating layer, and the support member is connected to the roof layer.

12. The manufacturing method of claim 11, wherein the forming of the substrate comprises: forming the thin film transistor on the substrate; forming a color filter on the thin film transistor; forming a common electrode on the color filter; forming an insulating layer on the common electrode; and forming the pixel electrode on the insulating layer.

13. The manufacturing method of claim 11, wherein an outer side of the support member is substantially aligned with one end of the roof layer, and wherein an inner side of the support member faces the first microcavity.

14. The manufacturing method of claim 12, further comprising: forming an organic layer between the color filter and the pixel electrode.

15. The manufacturing method of claim 14, further comprising: forming a light blocking member disposed on the pixel electrode.

16. The manufacturing method of claim 11, further comprising: forming an upper insulating layer disposed on the roof layer.

17. The manufacturing method of claim 16, wherein the lower insulating layer and the upper insulating layer are formed to contact each other at an end of the roof layer.

18. The manufacturing method of claim 17, wherein the upper insulating layer is formed to have a stepped shape.

19. The manufacturing method of claim 11, wherein the plurality of microcavities is disposed in a matrix form, and wherein two adjacent rows of the plurality of microcavities are spaced apart from each other by a valley, wherein the roof layer is not disposed in the valley.

20. The manufacturing method of claim 19, wherein the support member is formed to be adjacent to one side of the valley.

* * * * *